US008857880B2

(12) United States Patent
Kalergis et al.

(10) Patent No.: US 8,857,880 B2
(45) Date of Patent: Oct. 14, 2014

(54) CARGO BOX EXTENSION ASSEMBLY FOR VEHICLE

(75) Inventors: Peter Nicholas Kalergis, Canton, MI (US); Daniel P. Cousino, Carleton, MI (US); Frank Victor Bonello, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 13/271,583

(22) Filed: Oct. 12, 2011

(65) Prior Publication Data

US 2013/0094930 A1    Apr. 18, 2013

(51) Int. Cl.
| | | |
|---|---|---|
| *B62D 33/027* | (2006.01) | |
| *B62D 33/02* | (2006.01) | |
| *B60P 1/43* | (2006.01) | |
| *B62D 33/00* | (2006.01) | |

(52) U.S. Cl.
CPC ............... *B60P 1/43* (2013.01); *B62D 33/027* (2013.01); *B62D 33/02* (2013.01); *B60P 1/435* (2013.01); *B62D 33/0276* (2013.01); *B62D 33/00* (2013.01)
USPC .......... 296/26.05; 296/36; 224/403; 224/484; 224/543

(58) Field of Classification Search
CPC .... B62D 33/0276; B62D 33/033; B60P 1/435
USPC ................ 414/523, 537, 462; 296/26.11, 61, 296/26.08, 26.02, 26.04, 26.05; 14/71.1
See application file for complete search history.

(56) References Cited

U.S. PATENT DOCUMENTS

| | | | | | |
|---|---|---|---|---|---|
| 3,460,864 | A | * | 8/1969 | Piercy | 296/3 |
| 4,909,352 | A | * | 3/1990 | McComb | 182/127 |
| 5,478,130 | A | * | 12/1995 | Matulin et al. | 296/57.1 |
| 5,553,762 | A | * | 9/1996 | Brown | 224/403 |
| 5,732,995 | A | * | 3/1998 | Piccariello | 296/57.1 |
| 6,045,317 | A | | 4/2000 | Boucher et al. | |
| 6,082,801 | A | * | 7/2000 | Owen et al. | 296/26.11 |
| 6,152,510 | A | * | 11/2000 | Newsome | 296/10 |
| 6,158,798 | A | * | 12/2000 | Stedtfeld et al. | 296/61 |
| 6,163,913 | A | * | 12/2000 | DiSieno et al. | 14/71.3 |
| 6,296,290 | B1 | | 10/2001 | Wolf | |
| 6,332,637 | B1 | * | 12/2001 | Chambers | 296/3 |
| 6,575,516 | B2 | * | 6/2003 | Webber | 296/61 |
| 6,592,162 | B2 | * | 7/2003 | Felix et al. | 296/3 |
| 6,634,689 | B1 | * | 10/2003 | Soto | 296/3 |
| 6,749,246 | B2 | * | 6/2004 | Landwehr | 296/61 |

(Continued)

FOREIGN PATENT DOCUMENTS

| | | |
|---|---|---|
| JP | 2005206127 A | 8/2005 |
| WO | 2006040671 A2 | 4/2006 |

*Primary Examiner* — Gregory Adams
*Assistant Examiner* — Brendan Tighe
(74) *Attorney, Agent, or Firm* — Raymond Coppiellie; Price Heneveld LLP

(57) ABSTRACT

A modular ramp and cargo box extension assembly is provided for use in connection with a pickup truck cargo box. The ramp assembly has a ramp connector assembly provided on the vehicle tailgate and ramps having a connector for connecting to the ramp connector to serve as loading ramps. The ramp connector has a pivoting clevis bracket and tangs that connects into a channel on the tailgate. Vertical tracks are provided proximate walls of the cargo box and rails are provided in the tracks to retain the ramps and move between retracted and extended positions so as to extend the height of the cargo box.

21 Claims, 14 Drawing Sheets

(56) References Cited

U.S. PATENT DOCUMENTS

| | | | |
|---|---|---|---|
| 6,802,552 B2 * | 10/2004 | Hunt | 296/57.1 |
| 6,913,305 B1 * | 7/2005 | Kern et al. | 296/51 |
| 6,935,671 B2 * | 8/2005 | Bruford et al. | 296/57.1 |
| 6,988,756 B1 * | 1/2006 | Meinke et al. | 296/50 |
| 6,991,277 B1 * | 1/2006 | Esler | 296/50 |
| 7,070,222 B2 * | 7/2006 | Bruford et al. | 296/57.1 |
| 7,201,419 B2 * | 4/2007 | Masterton | 296/26.1 |
| 7,267,387 B1 * | 9/2007 | Bruford et al. | 296/57.1 |
| 7,677,626 B2 * | 3/2010 | Hanzel | 296/26.11 |
| 7,712,811 B2 * | 5/2010 | Heaman et al. | 296/26.08 |
| 7,819,295 B2 * | 10/2010 | Plavetich | 224/403 |
| 7,878,568 B2 * | 2/2011 | Wu | 296/37.6 |
| 8,087,709 B2 * | 1/2012 | Jackson, Sr. | 296/26.08 |
| 8,764,088 B1 * | 7/2014 | Jobe | 296/26.08 |
| 2001/0008605 A1 | 7/2001 | Schultz | |
| 2002/0153737 A1 * | 10/2002 | Fitts | 296/26.11 |
| 2002/0164239 A1 | 11/2002 | Angermeier | |
| 2008/0217944 A1 * | 9/2008 | Wood et al. | 296/26.11 |
| 2008/0231064 A1 * | 9/2008 | Plavetich | 296/26.11 |
| 2009/0214325 A1 * | 8/2009 | White | 414/537 |
| 2009/0309380 A1 * | 12/2009 | Stackpole | 296/26.09 |
| 2009/0309381 A1 * | 12/2009 | Nelson | 296/26.11 |
| 2010/0178142 A1 * | 7/2010 | Noddin et al. | 414/462 |
| 2012/0139281 A1 | 6/2012 | Cousino et al. | |

* cited by examiner

US 8,857,880 B2

CARGO BOX EXTENSION ASSEMBLY FOR VEHICLE

FIELD OF THE INVENTION

The present invention generally relates to vehicle cargo box assemblies, and more particularly relates to a modular cargo box assembly with height extenders for a pickup truck cargo box.

BACKGROUND OF THE INVENTION

Automotive vehicles, such as pickup trucks, are commonly equipped with a cargo box or bed that may be used to transport various items such as motorcycles, all-terrain vehicles (ATVs), four-wheelers (quads), garden and lawn tractors and other items. Heavy items such as these typically require the use of a loading ramp to assist with the loading and unloading of each item, such as an ATV, into and out of the cargo box of the pickup truck. Truck operators typically employ wood planks or aftermarket ramps of sufficient strength to support the weight of the item being loaded. Aftermarket ramps are commercially available in many forms and made of materials, such as aluminum, steel and composites, and typically come in single or multi-piece pairs, often fixed or hingedly connected, and may have many different surface treatments to provide traction.

Conventional loading ramps typically have tips at one end that sit on the tailgate of the pickup truck and the opposite end rests on the ground. Many ramps are equipped with tether straps to secure the ramp relative to the vehicle. Straps may be cumbersome and are susceptible to being cut or lost. Additionally, conventional ramps typically need to be secured or stored and may be prone to theft if left unsecured in a cargo area. Further, conventional ramps are often stored off the vehicle which may make the ramp inaccessible and inconvenient to the vehicle operator. Additionally, cargo boxes typically have fixed height side walls, which define a limited cargo carrying capacity.

It is desirable to provide for modular loading ramps that are easy to use on a vehicle without drawbacks associated with the conventional ramps and that may be conveniently stored on the vehicle and easily made available to a user. It is further desirable to provide for a modular cargo box that is extendable to allow retention of cargo items within a heighted box.

SUMMARY OF THE INVENTION

According to one aspect of the present invention, a vehicle bed height extender assembly is provided. The height extender assembly includes first and second vertical tracks proximate to a side wall of a vehicle bed, and first and second rails engaged to the first and second tracks. The height extender assembly further includes an extension member removably connected to either of the first and second rails or first and second tracks such that the extension member is movable between retracted and extended positions.

According to another embodiment, a truck bed height extender assembly is provided that includes a vertical track proximate to a side wall of a truck bed, and a rail engaged to the track. The height extender assembly further includes an extension member removably connectable to one of the rail and track such that the extension member is movable between retracted and extended positions to serve as a cargo box height extender.

According to another aspect of the present invention, a vehicle bed assembly is provided. The assembly includes a vehicle cargo box having a floor and first and second side walls, and first and second vertical tracks proximate to one of the side walls of a vehicle cargo box. The assembly also includes first and second rails engaged to the first and second tracks. The assembly further includes an extension member removably connected to either of the first and second rails and the first and second tracks such that the extension member is movable between retracted and extended positions.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
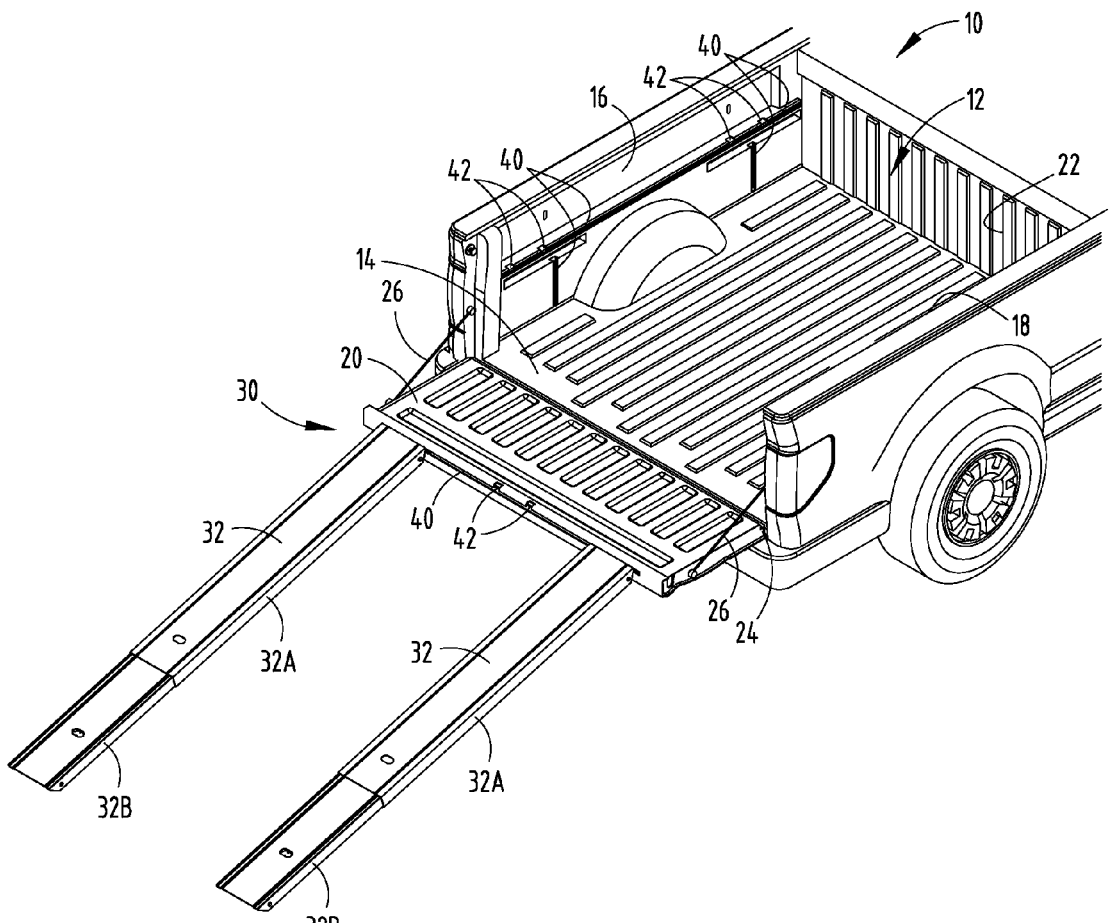
FIG. 1 is a rear side perspective view of a pickup truck cargo box having a ramp assembly with a pair of loading ramps attached to the tailgate, according to one embodiment.
Figure 2:
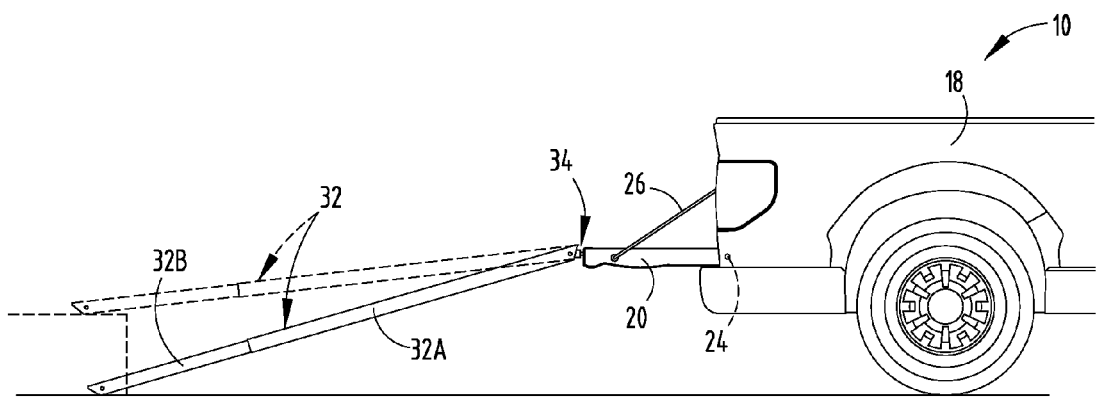
FIG. 2 is a side view of the truck and loading ramp assembly in FIG. 1 shown in loading positions.
Figure 17:
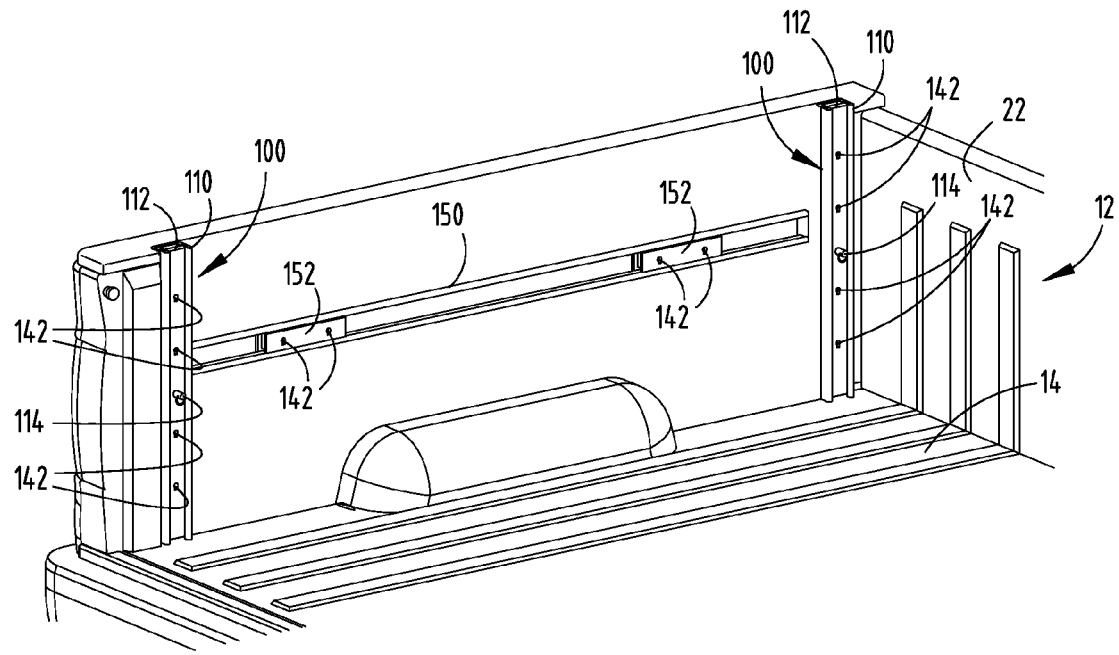
FIG. 17 is a partial perspective view of a cargo box of a vehicle having height extender assemblies shown in the retracted position, according to one embodiment.
Figure 18:
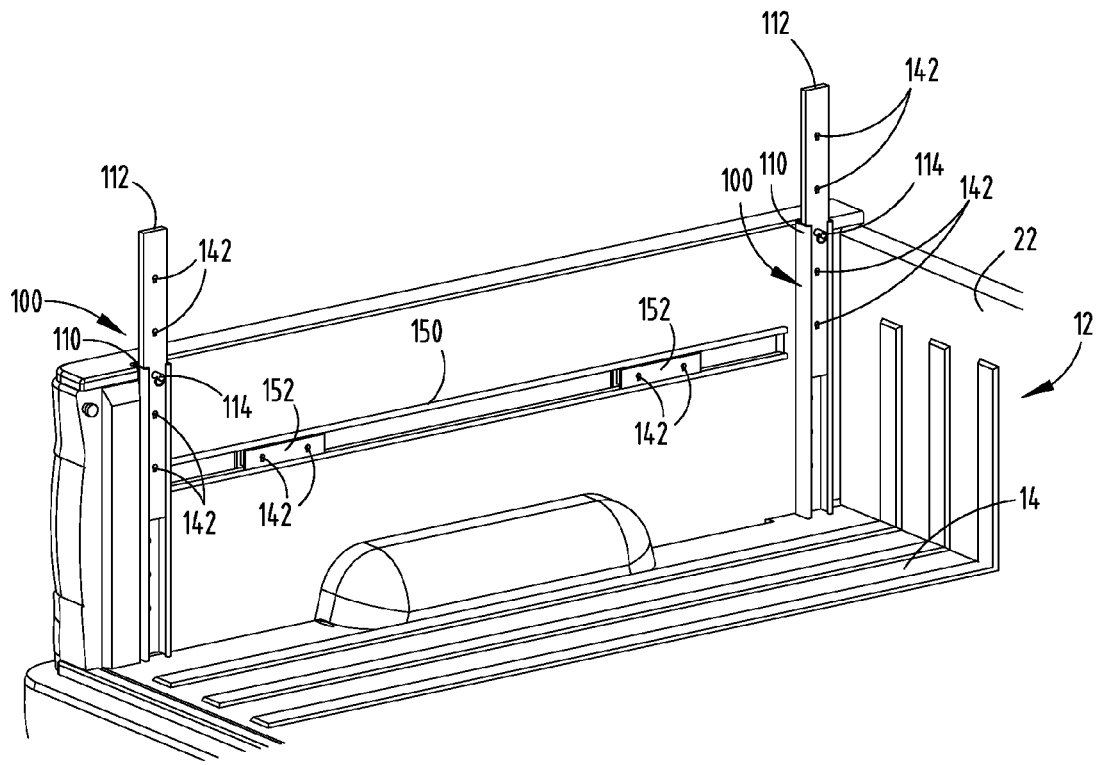
FIG. 18 further is a partial perspective view of the cargo box shown in FIG. 17 with the height extender assemblies shown in the deployed, extended position.
Figure 19:
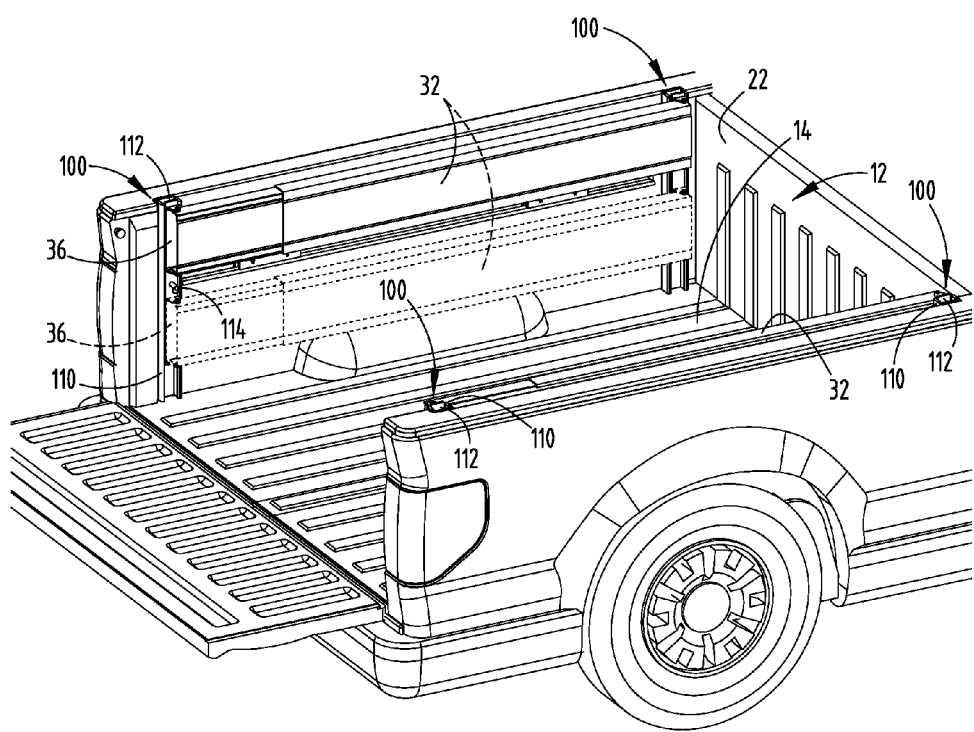
FIG. 19 is a perspective view of the cargo box shown with ramp extension members installed on the height extender assembly in the retracted position.
Figure 20:
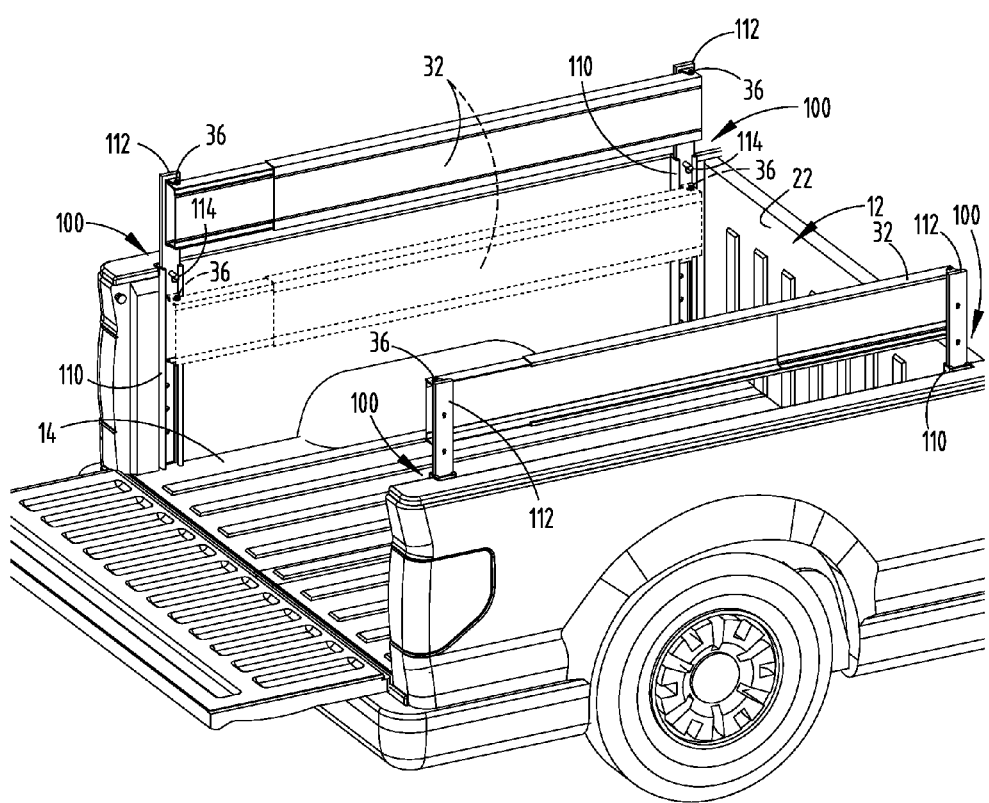
FIG. 20 is a perspective view of the cargo box shown with ramp members installed on the height extender assembly in the extended position.

For purposes of description herein, the terms "upper," "lower," "right," "left," "rear," "front," "vertical," "horizontal," and derivatives thereof shall relate to the vehicle, ramp assembly and cargo box height extender assembly as oriented in FIGS. 1, 2 and 17. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1 and 2, an automotive vehicle 10 in the form of a pickup truck is shown having a cargo box or bed 12 and equipped with a modular ramp assembly 30 arranged in the loading position, according to one embodiment. The cargo box 12 has a bottom floor 14 and four side walls 16, 18, 20 and 22 that generally define the shape of the box 12. The front wall 22 is adjacent to and rearward of the vehicle cab. The lateral side walls 16 and 18 are parallel to each other and generally extend above the rear wheel wells. The rear wall 20 is provided by a pivoting tailgate which pivots between a downward open position shown generally horizontal in FIG. 1 and an upright vertical closed position to serve as the rear wall of the cargo box 12. The tailgate 20 may include a conventional tailgate having a pair of hinge pivots 24 on opposite left and right sides near the bottom edge and a support cable 26 at each end to support the tailgate 20 when in the open horizontal position. The hinge pivots 24 may each include a hinge socket and pivot bracket that allows the tailgate 20 to pivot about the bottom edge relative to a supporting vehicle structure, such as a D-pillar, and may be keyed to allow removal of the tailgate 20 from the vehicle 10. The hinge pivots 24 may include a lift assist mechanism such as a tension rod or spring.

In the embodiment shown, the ramp assembly 30 has a pair of ramps 32 configured for assembly to a retaining channel 40 in tailgate 20 when the tailgate 20 is in the downward horizontal position to enable cargo items to be loaded on the ramps 32 into and out of the cargo box 12. However, it should be appreciated that the ramp assembly 30 may otherwise be configured to connect the ramps 32 directly to the floor 14, or other wall or surface leading to the cargo box 12 of the vehicle 10. It is contemplated that the tailgate 20 may be removed from the vehicle by disengaging the hinge pivots 24 and cables 26 such that the ramps 32 may be connected to a channel provided at the rear end of the floor 14, according to another embodiment.

Figure 6:
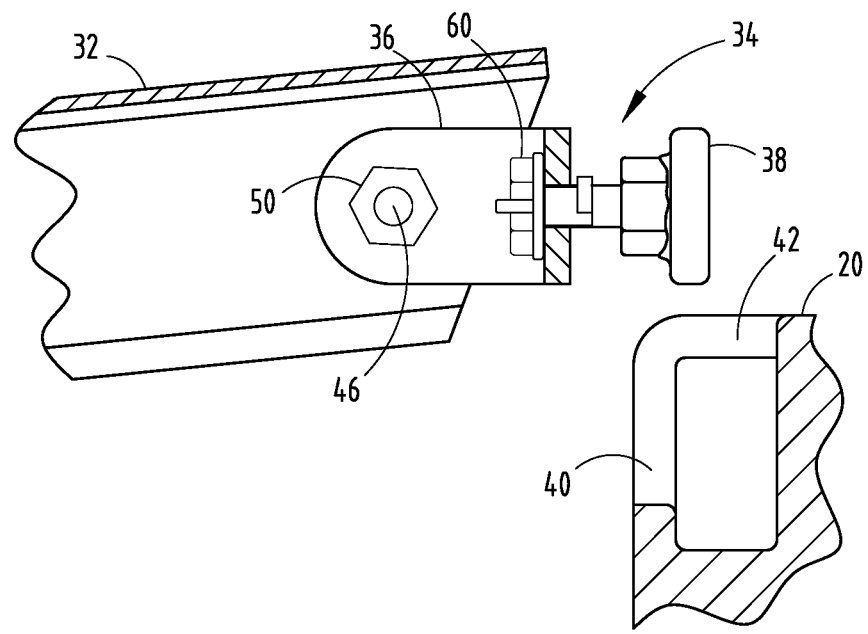
FIG. 6 is a cross-sectional view taken through line VI-VI of FIG. 3 illustrating assembly of the ramp to the tailgate channel via an enlarged opening.
Figure 7:
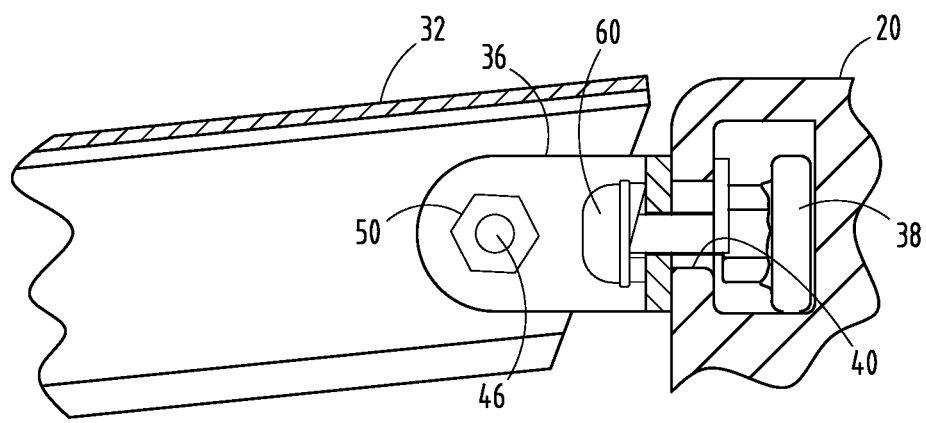
FIG. 7 is a cross-sectional view taken through line VII-VII of FIG. 3 illustrating locked engagement of the ramp to the tailgate channel.

In the embodiment shown, the tailgate 20 has a channel 40 formed in the outer wall at the outermost end of the tailgate 20. The channel 40 has a C-shaped cross-section and extends a substantial length of the tailgate 20 and allows for the retention of a ramp connector 34 having a pivoting clevis bracket and a pair of generally T-shaped tangs provided at ends of the ramps 32 to retain the ramps 32 in a desired position. The channel 40 has a pair of enlarged notches or openings 42 formed in an inner wall surface of the tailgate 20 as shown in FIG. 1. The openings 42 are sized and spaced to allow for the receipt of the pair of T-shaped tangs 38 on the pivoting clevis bracket 36. As seen in FIG. 6, the pair of T-shaped tangs 38 is inserted through the pair of openings 42 and into the channel 40. Once the T-shaped tangs 38 are inserted into channel 40 at the enlarged openings 42, each ramp 32 may slide laterally within the channel 40 to a position away from the openings 42 such that the T-shaped tangs 38 are matingly engaged with and trapped within the channel 40 as shown in FIG. 7. Accordingly, each ramp 32 may be engaged to the tailgate 20 by placing the pair of T-shaped tangs 38 into the pair of spaced, enlarged openings 42 shown at or near the center of the tailgate 20 to be matingly engaged within channel 40 and sliding the ramp left or right within channel 40 to a desired position to load cargo items, such as an ATV into the cargo box 12 of the vehicle 10. First, a first ramp may be installed in openings 42 and moved left within channel 40, and then a second ramp may be inserted into openings 42 moved to the right within channel 40 to define a pair of spaced apart ramps as shown in FIG. 1. It should be appreciated that the enlarged pair of openings 42 may be located elsewhere in communication with the channel 40 and that more than one pair of openings may be provided in communication with channel 40.

The ramps 32 are each shown provided as a telescoping ramp made up of a first section 32A slidingly engageable with and retained to a second section 32B. Ramp sections 32A and 32B are generally planar on top and have side walls that retain one section within the other section. The length of each ramp 32 may be adjusted by sliding ramp section 32B relative to ramp section 32A to realize a desired angle and position of the ramp 32. Additionally, the ramp 32 may pivot about the pivoting clevis bracket 34 as seen in FIG. 2. Accordingly, the ramps 32 may pivot to accommodate different elevations, such as the ground or a porch to change the angle of the ramp 32 as desired.

Figure 3:
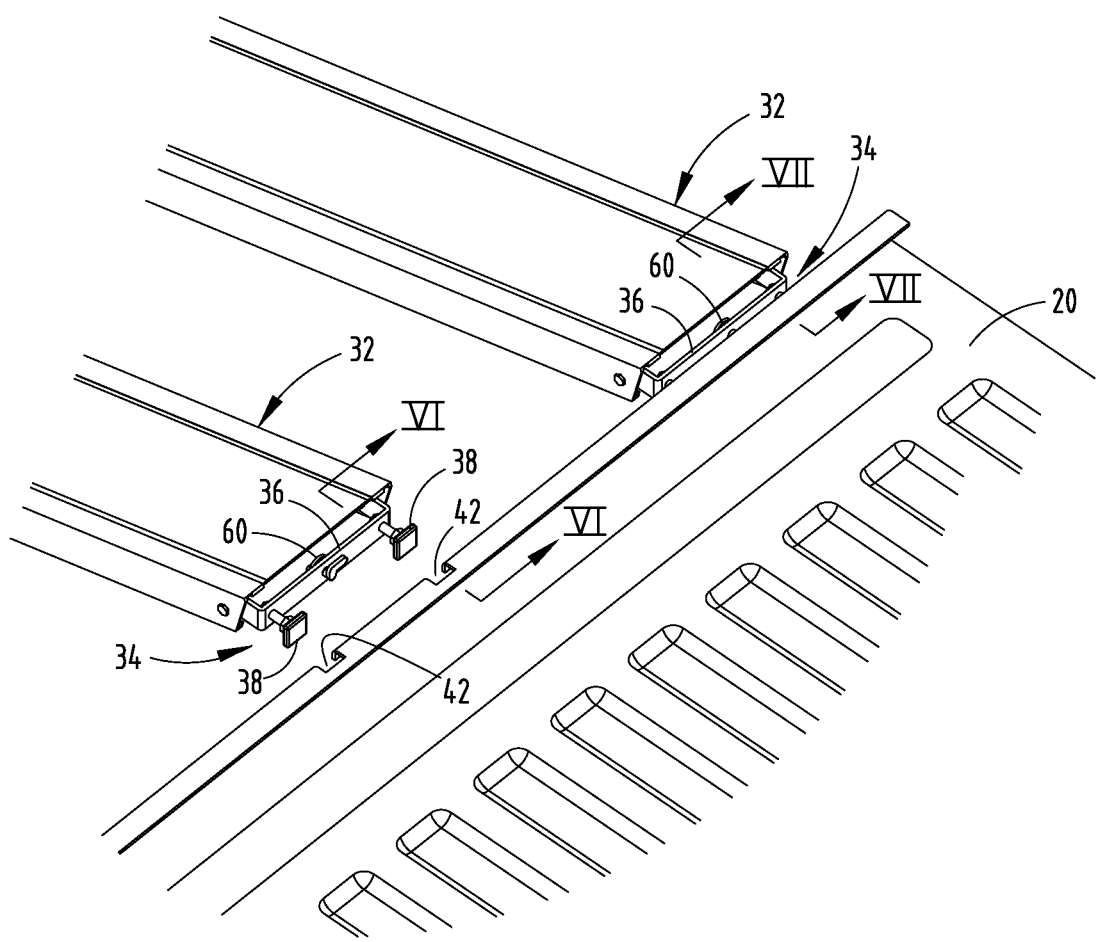
FIG. 3 is an enlarged top view of the loading ramp assembly showing the connection to the vehicle tailgate.
Figure 4:
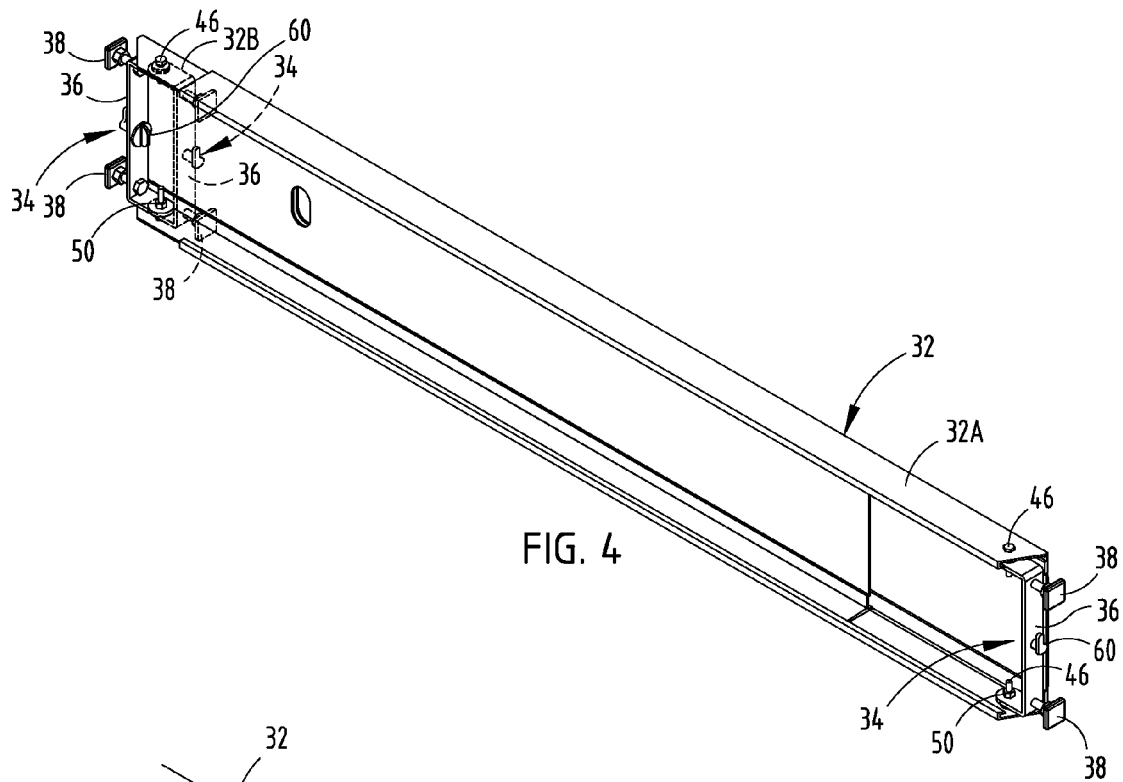
FIG. 4 is a bottom perspective view of the loading ramp having ramp connectors with pivoting clevis brackets and tangs connected on opposite ends, according to one embodiment.
Figure 5:
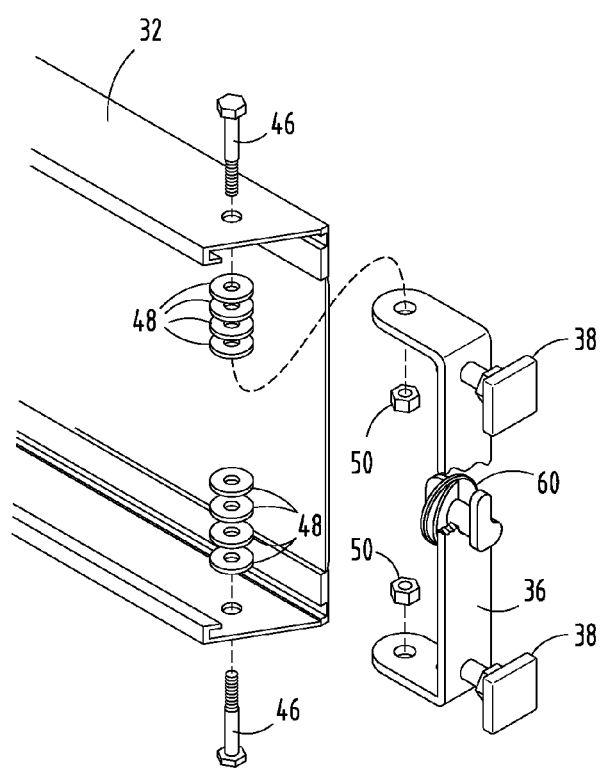
FIG. 5 is an enlarged exploded assembly view of one end of the ramp further illustrating the pivoting bracket ramp connector.

The assembly of each of the ramps 32 to the vehicle tailgate 20 into the loading position is illustrated in FIG. 3 with the ramp connector 34 of one ramp 32 matingly engaged with the retaining channel 40 and slid into a desired position on one side of the tailgate 20, and the other ramp 32 positioned for insertion into openings 42 to be installed in the retaining channel 40 in tailgate 20. Pivoting ramp connectors 34 are provided at opposite ends of the ramp 32 as shown in FIG. 4. Referring to FIG. 5, each pivoting ramp connector 34 has a U-shaped clevis bracket 36 pivotally connected to the ramp 32 via bolt 46, washers 48, and nut 50 such that bracket 36 is allowed to pivot about bolt 46 between an outward extended position and an inward stowed position as shown in dashed lines in FIG. 4. Accordingly, one end of the ramp 32 may connect via the pivoting ramp connector 34 to the tailgate 20 of the vehicle 10 in the extended outward position, and the other ramp connector 34 at the opposite end of the ramp 34 may be in the inward stowed position when used as a loading ramp. Thus, either end of ramp 32 may be connected via ramp connector 34 to the channel 40 of the tailgate connector. The U-shaped bracket 36 has a pair of T-shaped connectors 38, as seen in cross section, connected thereto for matingly engaging the opening 42 and C-shaped channel 40 in the embodiment shown. While a pair of T-shaped tangs is shown, it should be appreciated that other shaped connectors such as rectangular, oval, round or other cross sectioned shapes may be employed as connectors 38. A round shaped tang may allow for use as or with a bearing such that the round tang may spin within channel 40.

Figure 8:
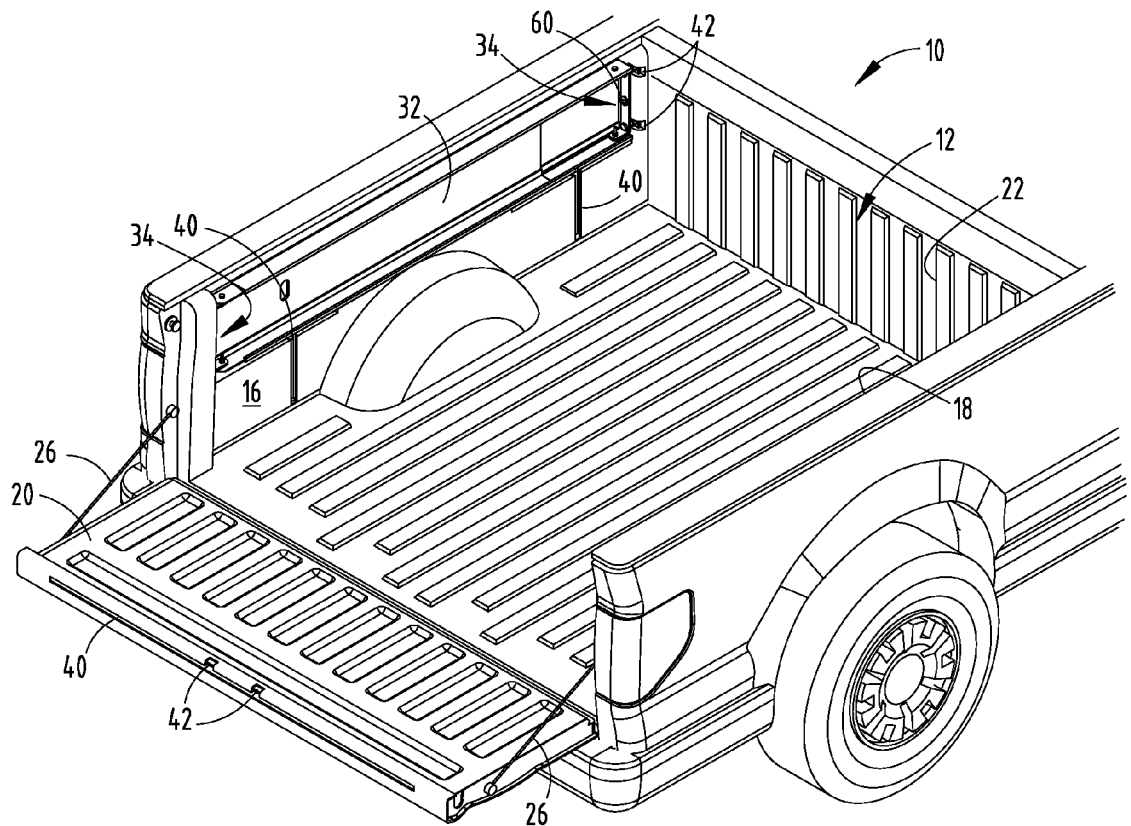
FIG. 8 is a rear perspective of the vehicle cargo box with one ramp stored in an inner side wall, according to a first embodiment.
Figure 9:
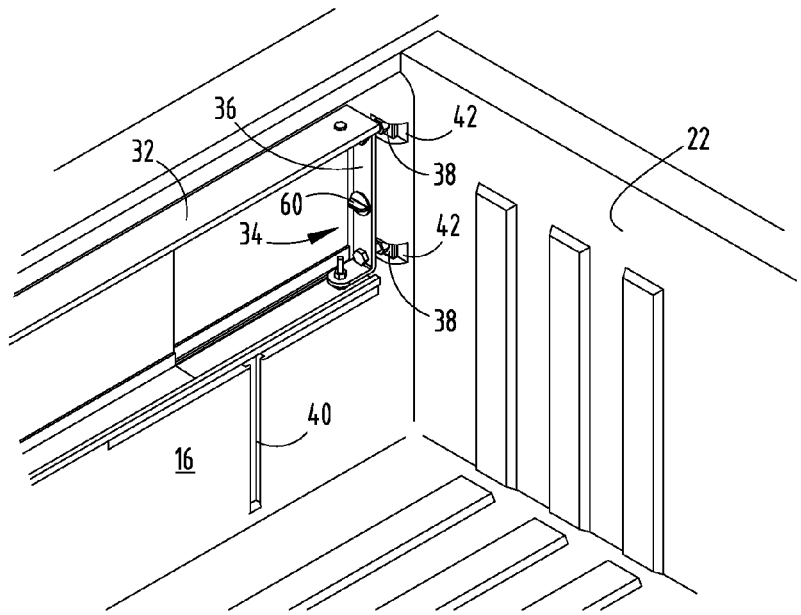
FIG. 9 is an enlarged partial view of the side wall and ramp of FIG. 8 further illustrating connection of the ramp to the cargo box side wall.

The ramp connector 34 is further shown in FIGS. 5-7 having a cam shaped twist lock 60 connected to the U-shaped clevis bracket 36. The cam-shaped twist lock 60 is shown having a threaded member that may be twisted to move outward from bracket 36 to form a frictional lock between the ramp connector 34 and a mounting surface, such as the tailgate 20 of vehicle 10. The cam-shaped twist lock 60 is used to hold each of the ramps 32 in place against the tailgate 20 once positioned at the desired location so that the ramp 32 does not move during the loading and unloading process. Additionally, the cam-shaped twist lock 60 may be used to hold a shelf or divider in place from sliding by turning the twist lock to form a frictional engagement with a portion of a cargo box. The cam-shaped twist lock may further be used to frictionally engage the cargo box side walls when stored therein as shown in FIGS. 8 and 9 to prevent relative movement between the ramps 32 and walls. The cam-shaped twist lock 60 may have various shapes and sizes for forming a frictional locking member and may be equipped with a keyed lock set for security to lock each of the ramps 32 onto the inner walls 16 and 18 of the cargo box 12 when used with the ramps 32. It should be appreciated that the twist lock 60 may include enhanced frictional materials, such as rubber or other frictional material that prevents sliding of the ramp relative to the tailgate 20 during use.

The ramp assembly 30 advantageously provides for a pair of ramps 32 that may be removably installed on the tailgate 20 of the vehicle 10 to allow for the loading and unloading of items into the cargo box 12. Ramps 32 may be easily removed by a user from the C-shaped channel 40 through openings 42 of the tailgate connector. The removed ramps 32 may be stowed within the inner side of the lateral walls 16 and 18 of cargo box 12 as seen in FIGS. 8 and 9, according to one embodiment. In this embodiment, the pivoting ramp connectors 34 are deployed in their outward extending positions at opposite ends of each ramp 32 and the connectors 34 are installed through openings 42 into a vertical channel 40 formed in the lateral side walls 16 and 18. In the two ramp embodiments, one ramp 32 is installed in inner side wall 16 and the other ramp 32 is installed in inner side wall 18. Each vertical channel 40 receives the pair of T-shaped tang connectors 38 at opening 42 as best seen in FIG. 9 and the ramp 32 drops downward and is retained by the T-shaped tang connectors 38 of ramp 32 trapped within channel 40. Thus, the pair of ramps 32 are retained in place stored within the cargo box 12 adjacent the vehicle side walls for convenient storage and transportation of the ramps. A user may conveniently remove the ramps 32 from the tailgate 20 when desired and restore the ramps 32 in the side walls 16 and 18 of the cargo box 12 and vice versa.

Figure 10:
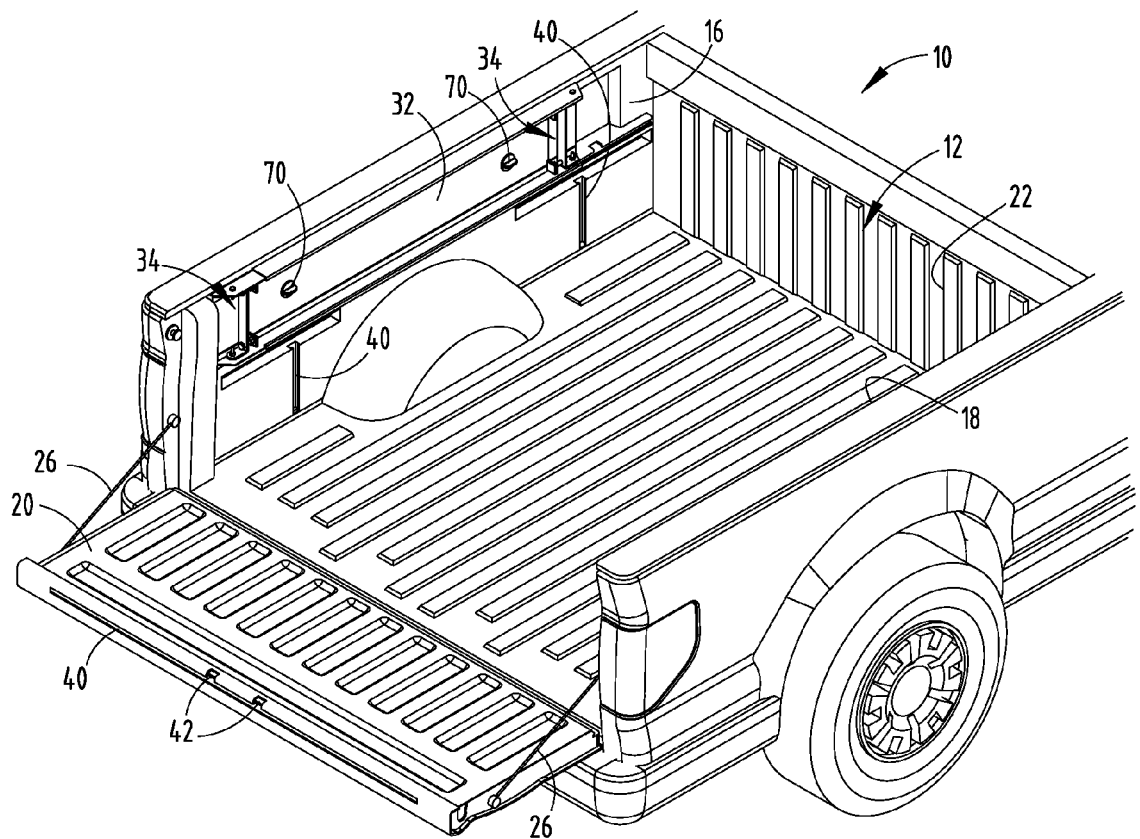
FIG. 10 is a rear perspective view of the cargo box illustrating storage of one ramp to an inner side wall, according to a second embodiment.
Figure 11:
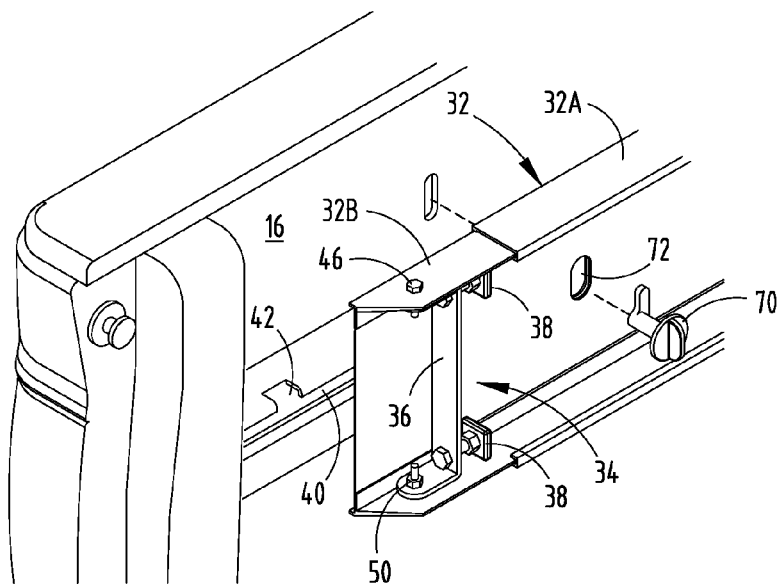
FIG. 11 is an enlarged partial view of one end of the side wall and ramp of FIG. 10 further illustrating connection of the ramp to the cargo box side wall.

Referring to FIGS. 10 and 11, the ramps 32 are shown stored within the side walls 16 and 18 with a pair of twist lock connectors 70, according to a second embodiment. In this embodiment, the twist lock connectors 70 are insertable through openings 72 in the ramp 32 and into threaded openings in wall 16 or 18 and may be twisted by a predetermined angle, such as ninety degrees (90°), to lock the connectors 70 and ramp 32 in place. Thus, twist lock connectors 70 retain the loading ramp 32 positioned against the inner surface of the lateral wall. The twist lock connectors 70 may be locked to the side wall 16 or 18 via a locking mechanism to prevent theft or unauthorized removal of the ramp 32. Also, in this position, the pivoting ramp connectors 34 may be positioned in the inward stowed positions.

Figure 12:
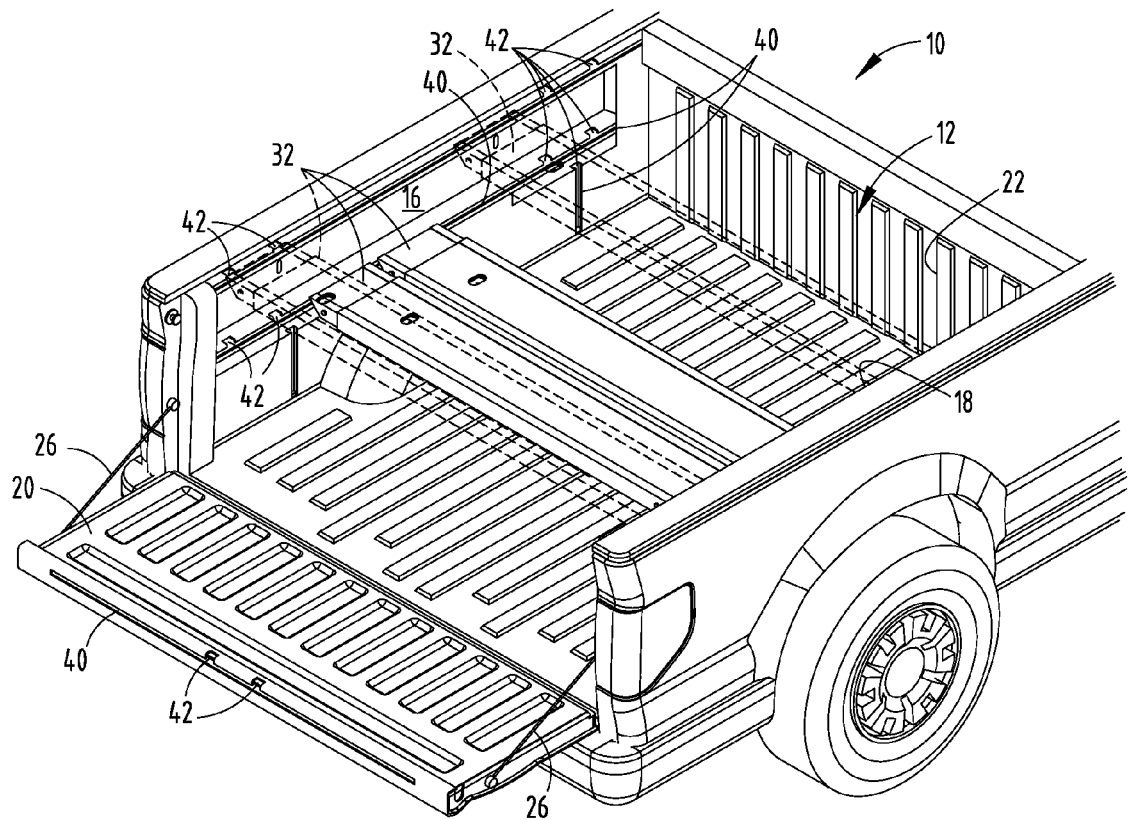
FIG. 12 is a rear perspective view of the vehicle cargo box having a pair of ramps oriented to form cross-members in the form of shelves shown in multiple positions, according to one embodiment.
Figure 13:
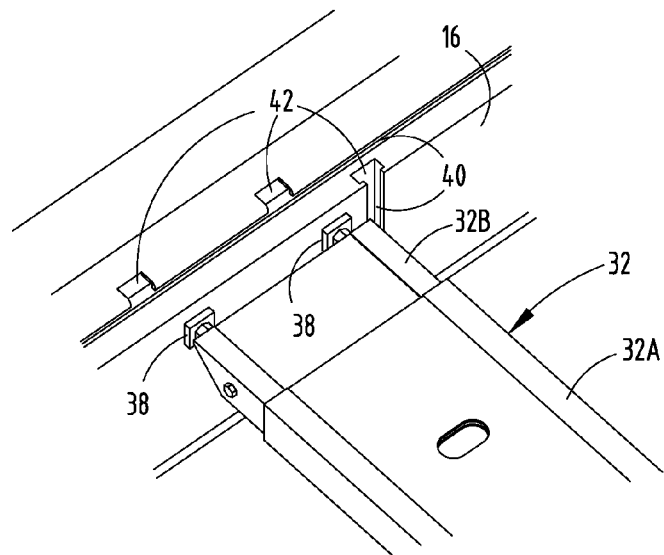
FIG. 13 is an enlarged top view of one end of a ramp to be assembled to the cargo box to form a shelf.
Figure 14:
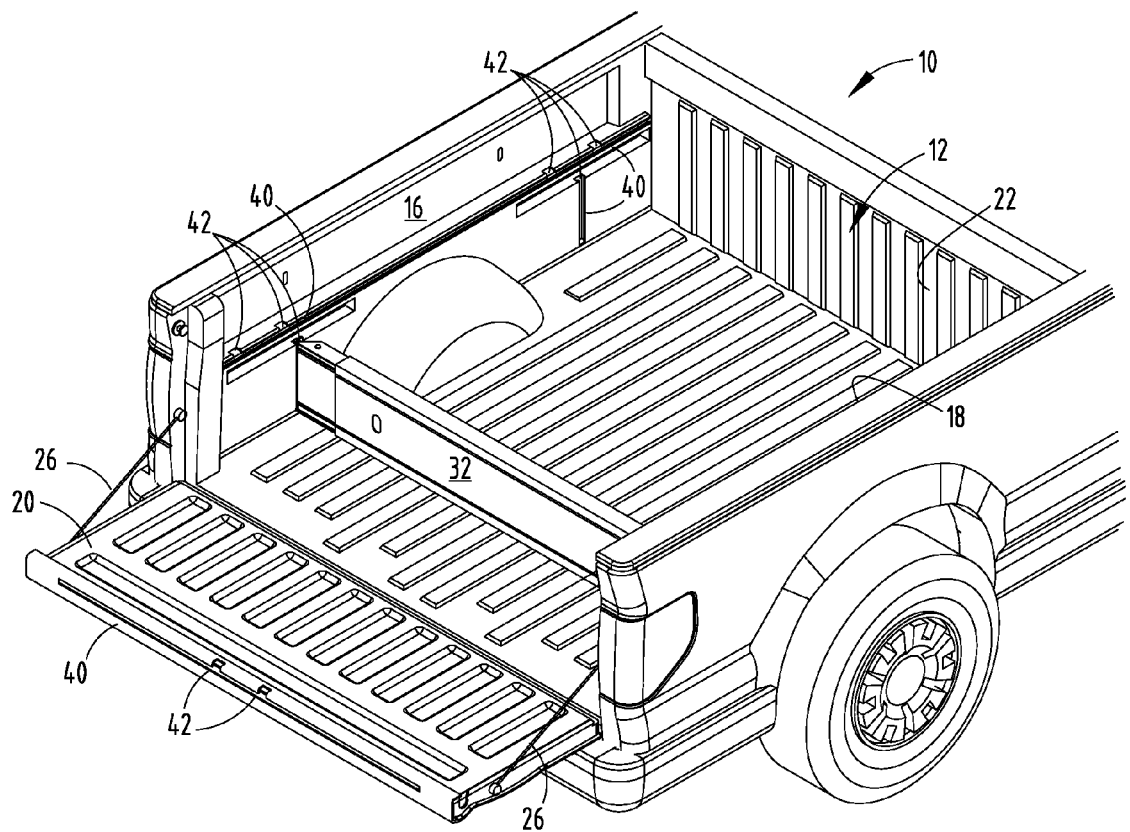
FIG. 14 is a rear perspective view of a ramp assembled to the cargo box side walls to form a cross-member in the form of a divider, according to one embodiment.
Figure 15:
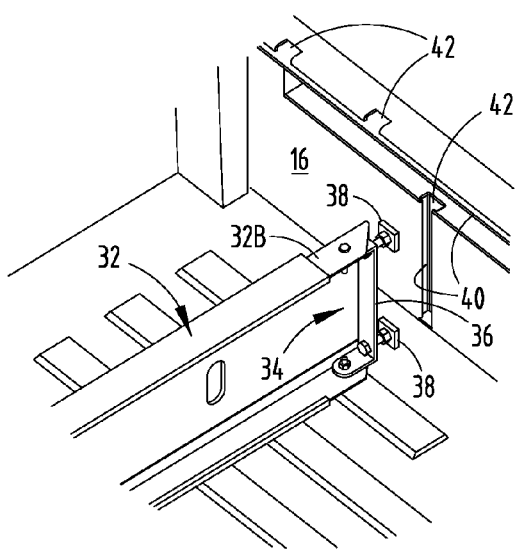
FIG. 15 is an enlarged top view of one end of a ramp to be assembled vertically to the cargo box side wall to form a divider.
Figure 16:
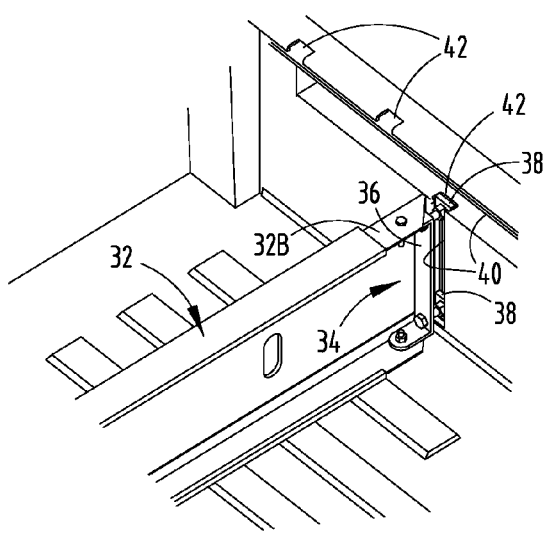
FIG. 16 is an enlarged top perspective view of one end of the ramp forming a divider further shown assembled to the side wall of the vehicle cargo box.

The ramp assembly 30 is modular in that the ramps 32 are also employable to operate as cross-members in the cargo box 12. A cross-member may serve as a shelf as shown in FIGS. 12 and 13 or as a divider member as seen in FIGS. 14-16. Referring specifically to FIGS. 12 and 13, the ramps 32 are shown installed within horizontal C-shaped retaining channels 40 of cargo box connectors on opposite side walls 16 and 18 by engaging the outward existing and pivoting clevis bracket and T-shaped tangs 38 of ramp connector 34 within the channel 40 by insertion through openings 42 to form one or more shelves. The ramps 32 may slide within the horizontal channel 40 to a desired shelf position. The cargo box 12 may include two horizontal channels 40 each having an enlarged opening 42 at two or more different elevations to provide different height shelves as shown by solid and dashed lines in FIG. 12. Accordingly, objects may be placed upon the shelves 32 which may be positioned at various positions within the cargo box 12. It should also be appreciated that the length of each shelf 32 may be changed to accommodate the bed shape by extending or refracting the length of the ramps 32.

Referring to FIGS. 14-16, the ramp 32 is shown provided as a vertical wall or divider member which may serve to divide cargo or retain cargo within the cargo box 12. In this application, the pivoting clevis bracket 36 and its T-shaped tangs 38 of the ramp connectors 34 are inserted through openings 42 and into vertical retaining channels 40 of the cargo box on opposite side walls 16 and 18 and retained in place by the vertical channels 40 as shown. One, two or more vertical channels 40 may be provided in each of the side walls 16 or 18 for matingly engaging the ramp connectors 34 to form the divider walls. It should further be appreciated that ramp 32 may be connected to extend longitudinally to provide a left and right side divider connected to the front wall 22 and tailgate 20.

Referring to FIGS. 17-22, the cargo box or bed 12 of a pickup truck is generally illustrated having height extender assemblies 100 provided in each of the side walls 16 of the cargo box 12, according to one embodiment. Each truck bed height extender assembly 100 includes first and second vertical tracks 110 proximate to a side wall 16 of a truck bed 12. First and second rails 112 are matingly engaged to the first and second tracks 110, respectively, such that the rails 112 move relative to the respective track 110 between a retracted position shown in FIGS. 17 and 19 and an extended position shown in FIGS. 18 and 20. One or more extension members 32 are removably connected to either of the first and second rails 112 or the first and second tracks 110 such that the extension member(s) 32 is movable between extended and retracted positions. In the extended position, one or more extension members 32 connected to pairs of rails 112 extend the effective height of the sides of the cargo box 12.

First connectors are provided on each of the first and second rails 112 in the embodiment shown, however, it should be appreciated that the first connector may be provided on the first and second tracks 110, according to another embodiment. The height extender assembly 100 includes the one or more extension members such as ramps 32 each having second connectors for connecting to the first connectors. The extension member 32 is shown and described herein as a ramp, according to one embodiment, however, other extension members may be employed. The ramp 32 or other extension member may be extendable longitudinally as discussed herein to adjust the length of the ramp 32 to fit in the assembly 100.

The first and second vertical tracks 110 are shown connected to the interior side of each of side walls 16 and 18 defining the cargo box 12. Each height extender assembly 100 includes a first track 110 located near the forward end of the cargo box 12 and a second track 110 located near the rearward end of the cargo box 12. The vertical tracks 110 may be fastened via bolts or other fasteners onto the inner surface of the cargo bed side walls 16 and 18, according to one embodiment. According to other embodiments, the tracks 110 may be welded or otherwise integrally formed in the side walls 16 and 18.

The vertical tracks 110 have elongated side walls shaped to receive a rail 112 which is shown generally in the shape of a rectangular bar. Each rail 112 slides within the respective track 110 between a lower retracted position and an upward extended position. The top end of each track 110 has an opening that allows the corresponding rail 112 engaged thereto to extend therethrough, particularly when the rail 112 is in the extended position. While the rails 112 are each shown having a rectangular shape that is trapped and moves within a track 110, it should be appreciated that other shapes and sizes of rails and tracks may be employed to allow a rail to move relative to a track between extended and retracted positions.

Figures 21, 22:
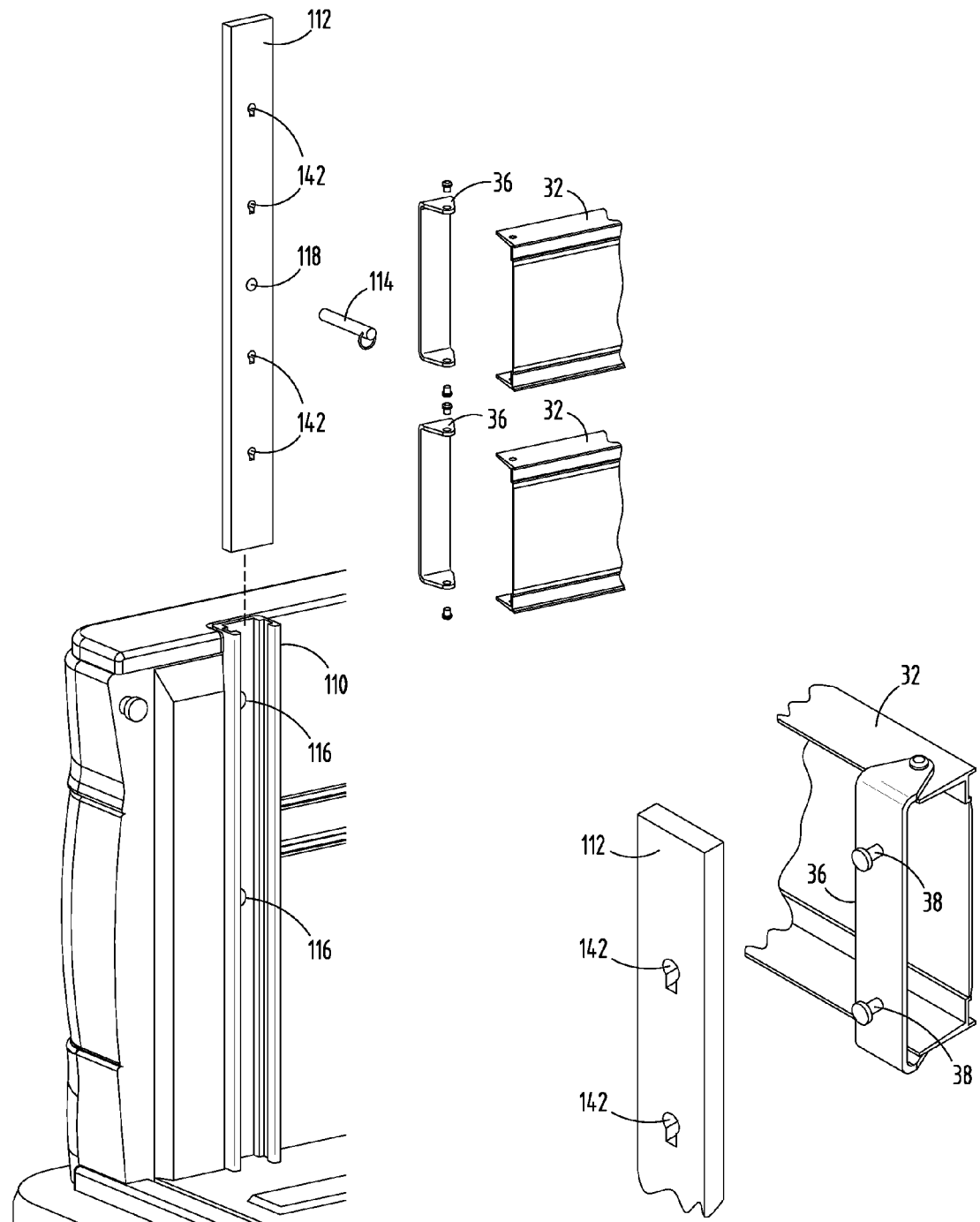
FIG. 21 is an exploded assembly view of one of the height extender assemblies shown in FIG. 17.
FIG. 22 is an assembly view showing mating engagement of the ramp connectors onto the height extender assembly.

Referring to FIG. 21, each vertical track 110 has a plurality of openings or receptacles 116 provided in the rear wall and adapted to receive a height locking pin 114. Locking pin 114 is removable and extends through hole 118 provided in rail 112 and further extends into one of the height selectable openings 116 in track 110 to fix or lock the rail 112 in position relative to the track 110. In one embodiment, locking pin 114 may include a pin extendable manually by a user to set the adjusted height of the rail 112 and hence extension member 32. It should be appreciated that other locking type mechanisms may be employed to adjust and maintain the rail 112 and extension member 32 at a desired elevation or height relative to the track 110.

The extension members 32 that connect to the rails 112 are shown and described herein as ramps 32. It should be appreciated that ramp 32 may be used as a ramp connectable to the tailgate as described herein, and may be further removed from the tailgate and installed onto a pair of rails 112 to serve as height extension members. With a ramp 32 connected to a pair of rails 112, the ramp 32 may be moved vertically between a retracted position shown in FIG. 19 and an upward extended position shown in FIG. 20. Hence, the ramp 32 may not only be stowed within the side wall 16 of the vehicle, but may also serve as a height extender for the cargo bed 12 to allow for enhanced elevation and retention of items in the cargo bed 12. Lower ramp 32 shown in dashed lines is shown in an optical position for a two ramp system, however, more than two ramps may be employed on the vehicle.

To receive and connect to the ramp 32, each rail 112 has first connectors shown as pairs of receivers 142 in the shape of keyholes for receiving second connectors shown as pairs of T-shaped tangs 38 on opposite ends of ramp 32. As seen in FIG. 21, upper and lower pairs of receivers 142 are provided for receiving first and second ramps 32. The connection of the ramp 32 to the receivers 142 is further illustrated in FIG. 22. In the embodiment shown, the T-shaped tangs 38 of ramp 32 have a round or disc shape of a size sufficient to extend through the upper portion of receiver 142 and drop down into the lower narrow slot to lock the T-shaped tangs 38 in place within receivers 42. While the T-shaped tangs 38 are shown having a circular shape herein, it should be appreciated that the shape of each T-shaped tang 38 and receiver 42 may otherwise be configured such as in a rectangular shape or other shapes to provide a mating engagement to hold the ramp 32 in place relative to the rail 112. The ramp 32 has U-shaped brackets 36 at each end such that the pair of T-shaped tangs 38 provided thereon may be aligned with the corresponding pair of receivers 142.

Figure 23:
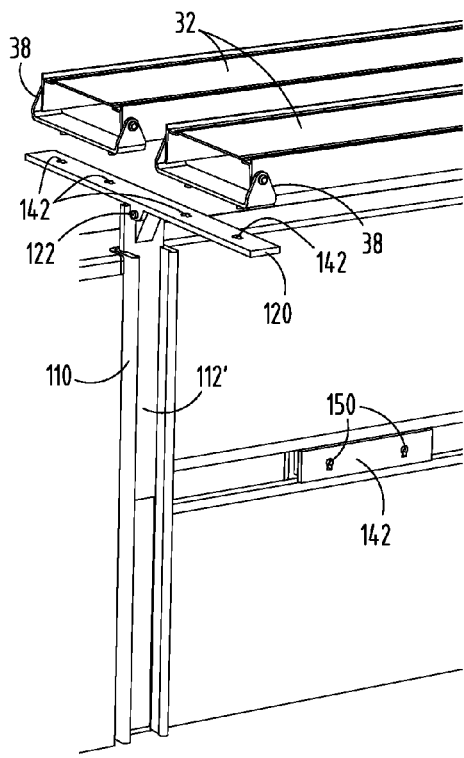
FIG. 23 is a perspective view of a height extender assembly having a pivoting rail shown deployed in a horizontal position, according to another embodiment.
Figure 24:
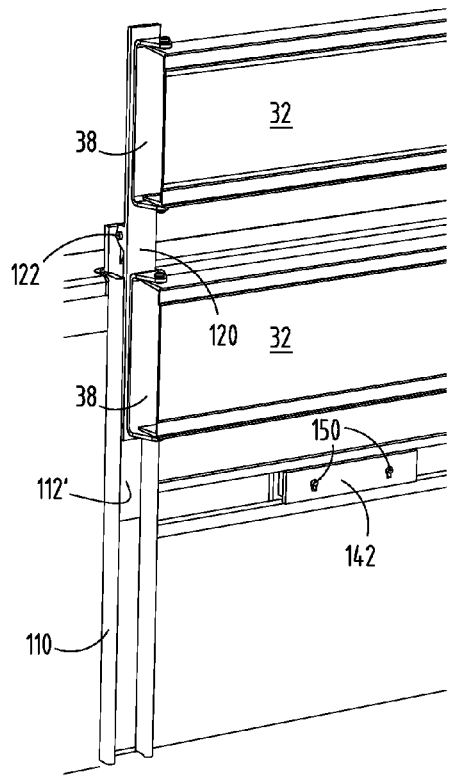
FIG. 24 is a perspective view of the height extender assembly shown in FIG. 23 with the pivoting rail shown extended vertically.
Figure 25:
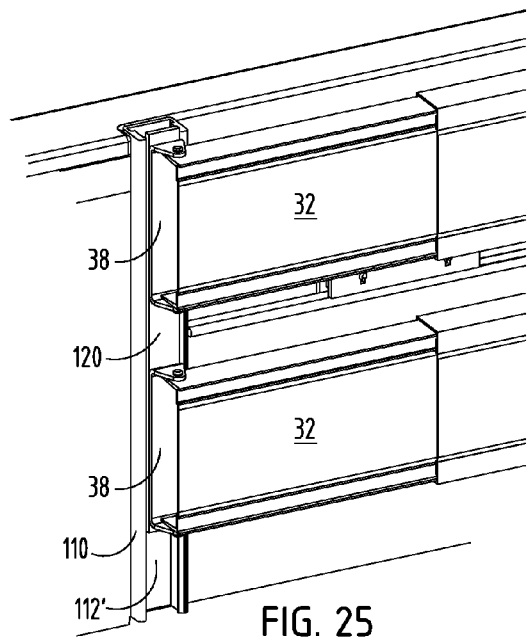
FIG. 25 is a perspective view of the height extender assembly shown in FIG. 23 with the pivoting rail shown retracted.

Referring to FIGS. 23-25, a height extender assembly 100 is illustrated having a pivotable cross-member 120 pivotally connected to a rail 112' that is matingly engaged with a vertical track 110. The pivotable cross member 120 is coupled to rail 112' via a pivoting connector, such as pin 122, to allow the cross-member 120 to pivot between a horizontal position as shown in FIG. 23 and a vertical position as seen in FIGS. 24 and 25. A pair of ramps or other extension members 32 may be connected to the pivotal cross-member 120. With the ramps 32 connected to pivotable cross member 120 and pivotable cross member 120 oriented in the horizontal position, a user may employ the height extender assembly 100 as a horizontal platform that extends above the cargo bed walls 16 and 18. The pivotal cross member 120 may then be pivoted vertically as shown in FIG. 24 to provide for vertical height extenders. The rail 112 with pivotal cross-member 120 may be slid downward in vertical track 110 to a retracted position shown in FIG. 25 so as to store the ramps 32 in a lowered non-extended or retracted position. It should be appreciated that the extension members 32 may connect to pairs or rails via first and second connectors as discussed above.

Figure 26:
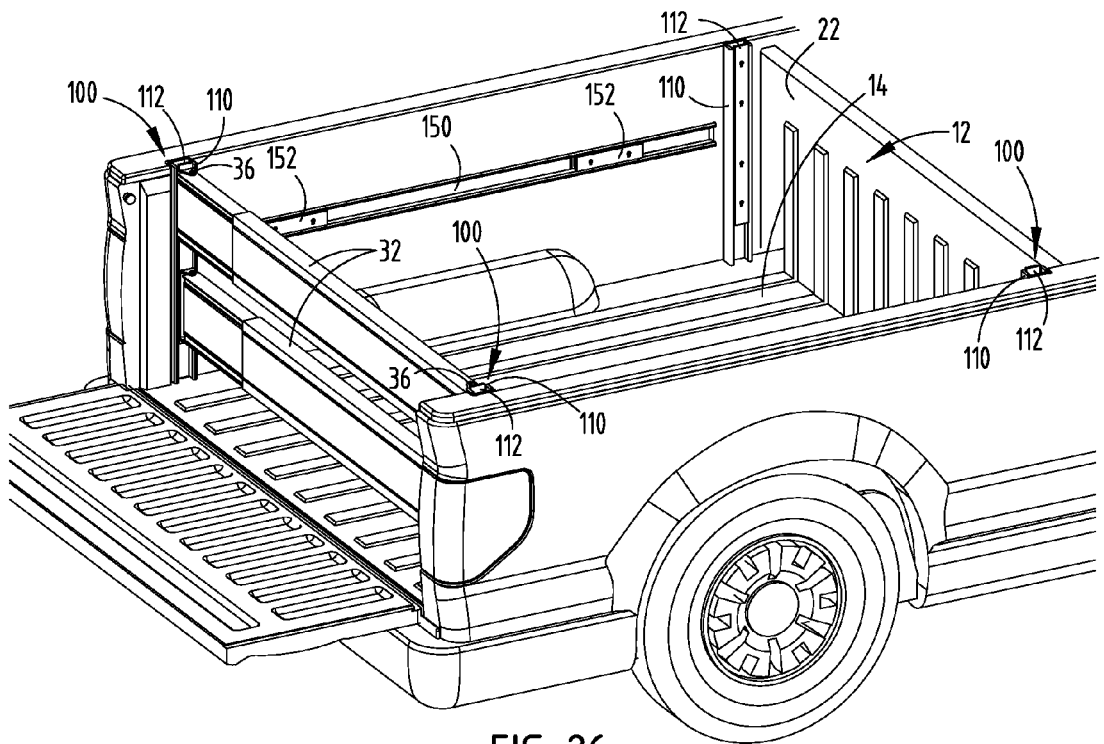
FIG. 26 is a perspective view of the cargo box with ramps installed onto height extenders on opposite sides of the cargo bed.

While the extension members 32 are shown engaging rails 112 on the same side wall of a vehicle to provide side wall extension members, it should be appreciated that the extension members 32 may otherwise be deployed to provide height extenders at the rear of the vehicle as shown in FIG. 26. In this embodiment, a pair of ramps 32 are connected between a first rail 112 on one side at the rear of the vehicle and a second rail 112 at the opposite side at the rear of the vehicle such that the ramps form a cargo retention wall. The ramps 32 and rails 112 may be extended upward above the top end of the side walls of the vehicle cargo box 12 to provide a rear height extender. It should further be appreciated that the ramps 32 may be connected to the front rails to provide a front extender, according to another embodiment.

Figure 27:
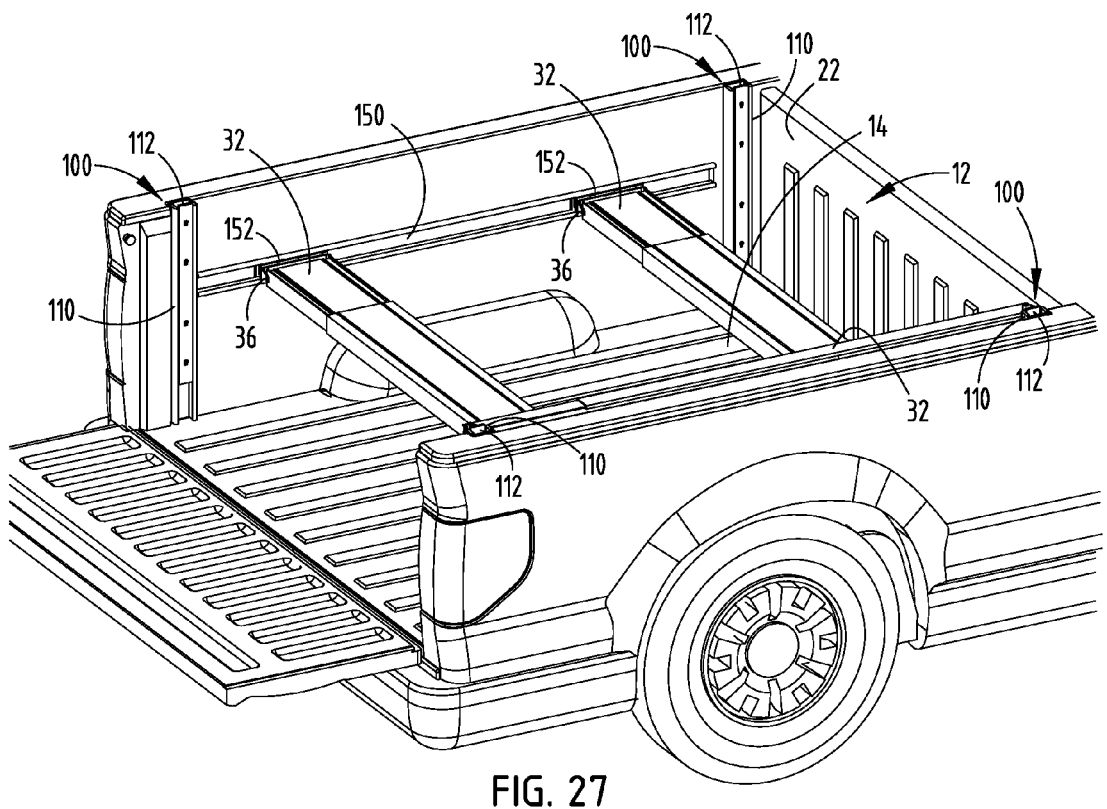
FIG. 27 is a perspective view of the cargo box with ramps installed on a horizontal rail and track for providing an adjustable platform, according to a further embodiment.

The cargo bed 12 is further shown in FIG. 17 having a horizontal track 150 receiving first and second rails 152 such that rails 152 may move horizontally within track 150. Each rail 152 includes a pair of first connectors in the forms of receivers 142 for receiving T-shaped connectors on a ramp or other extension member 32 such that the ramp 32 may be assembled to rails 152 as shown in FIG. 27. Once assembled to track 150, each ramp 32 may be movable forward and backward on rail 152 by sliding within track 150 to provide for a horizontal divider which allows for seating or shelf.

Accordingly, the loading ramp assembly 30 and height extender assembly 100 advantageously provides for an easy to use and store loading ramp assembly and height extender for a vehicle, particularly a pickup truck 10. The ramps 32 may be installed in the tailgate 20 of the vehicle 10 without the need for retaining straps and may be easily stored against an inner side wall of the lateral side walls 16 and 18 and out of the way in a manner that is efficiently stored. The ramps 32 may be moved up and down between extended and retracted positions on the rail and track arrangement as needed to provide a desired height extension to the cargo box side walls. The ramps 32 may be further employed as a modular assembly to form one or more shelves and to form one or more dividers within the vehicle cargo box 12. It should further be appreciated that further connector locations and assemblies may be employed to retain the ramp members 32 or other extension members in various orientations of the vehicle cargo box 12.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle bed height extender assembly comprising:
   first and second vertical tracks connected to a lateral interior side wall of a vehicle bed;
   first and second rails engaged to the first and second tracks; and
   a longitudinally telescoping extension member slidingly adjustable in length and removably connected to the first and second rails such that the extension member extends along the side wall and is vertically movable between upward extended and lower retracted positions.

2. The assembly of claim 1, wherein the extension member comprises a telescoping ramp.

3. The assembly of claim 2, wherein the ramp is removably connected to the first and second rails and may be connected to a tailgate of the vehicle.

4. The assembly of claim 2, wherein the telescoping ramp comprises first and second sections that slide relative to one another to longitudinally adjust the length of the ramp.

5. The assembly of claim 1, wherein the first and second rails each comprise first connectors and the extension member comprises second connectors that removably connect to the first connectors.

6. The assembly of claim 5, wherein the first connector comprises one or more enlarged keyhole shaped openings and the second connector comprises one or more tangs configured to fit in the one or more enlarged keyhole shaped openings.

7. The assembly of claim 1, wherein the extension member comprises a pivoting clevis bracket having one or more tangs attached thereto.

8. The assembly of claim 1 further comprising a pivotable cross member coupled to each of the first and second rails, wherein the cross member pivots between a vertical position and a horizontal position.

9. The assembly of claim 1, wherein the extension member may also be employed as one of a ramp, a divider, and a shelf.

10. The assembly of claim 1, wherein the vehicle bed is a pickup truck cargo box.

11. A truck bed height extender assembly comprising:
    a vertical track connected to a lateral interior side wall of a truck bed;
    a rail engaged to the track such that the rail moves relative to the track; and
    an extension member removably connectable to the rail such that the extension member is movable vertically between a lower retracted position and an upward extended position to serve as a cargo box height extender of the side wall, wherein the extension member comprises a telescoping ramp that is slidingly extendable longitudinally to adjust length of the extension member.

12. The extender of claim 11, wherein the vertical track comprises first and second tracks and the rail comprises first and second rails, and wherein the first rail is movable in relation to the first track to extend and retract the extension member and the second rail is movable in relation to the second track to extend and retract the extension member.

13. The assembly of claim 11, wherein the rail has a first connector and the extension member has a second connector that removably connects to the first connector.

14. A vehicle bed assembly comprising;
    a vehicle cargo box having a floor and first and second side walls;
    first and second vertical tracks connected to a lateral interior side wall of a vehicle cargo box;
    first and second rails engaged to the first and second tracks; and
    an extension member removably connected to the first and second rails such that the extension member extends along the side wall and is movable between upward and downward positions, wherein the extension member comprises a telescoping ramp that is slidingly extendable longitudinally to adjust length of the extension member.

15. The assembly of claim 14 further comprising removable connectors for removably connecting the extension member onto the first and second rails.

16. The assembly of claim 15, wherein the removable connectors comprise first connectors provided on the first and second rails and second connectors provided on the extension member, wherein the first connectors are removably connectable to the second connectors.

17. The assembly of claim 14, wherein the first connector comprises one or more enlarged openings and the second connector comprises one or more tangs configured to fit in the one or more enlarged openings.

18. The assembly of claim 14, wherein the ramp comprises a first section that slides relative to a second section to adjust the length of the ramp.

19. The assembly of claim 14, wherein the vehicle cargo box is a pickup truck bed.

20. A vehicle bed height extender assembly comprising:
    first and second vertical tracks connected to a lateral interior side wall of a vehicle bed;
    first and second rails engaged to the first and second tracks; and
    a telescoping ramp slidingly adjustable in length and removably connected to the first and second rails such that the telescoping ramp extends along the side wall and is vertically movable between upward extended and lower retracted positions.

21. A vehicle bed height extender assembly comprising:
    first and second vertical rails connected to a lateral interior side wall of a vehicle bed;
    first and second tracks engaged to the first and second rails; and
    a longitudinally telescoping extension member slidingly adjustable in length and removably connected to the first and second tracks such that the extension member extends along the side wall and is vertically movable between upward extended and lower retracted positions.

* * * * *